United States Patent
Arroyo Beltri et al.

(10) Patent No.: US 11,867,150 B2
(45) Date of Patent: Jan. 9, 2024

(54) AZIMUTH SENSORS IN WIND TURBINES

(71) Applicant: General Electric Renovables Espana, S.L., Barcelona (ES)

(72) Inventors: Pedro Arroyo Beltri, Barcelona (ES); Efren Albisu Iso, Barcelona (ES); Louis Bond-Smith, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/856,155

(22) Filed: Jul. 1, 2022

(65) Prior Publication Data

US 2023/0003199 A1 Jan. 5, 2023

(30) Foreign Application Priority Data

Jul. 5, 2021 (EP) .................................. 21382596

(51) Int. Cl.
*F03D 17/00* (2016.01)

(52) U.S. Cl.
CPC ........ *F03D 17/00* (2016.05); *F05B 2270/327* (2013.01); *F05B 2270/329* (2013.01)

(58) Field of Classification Search
CPC .. F03D 17/00; F05B 2260/80; F05B 2260/83; F05B 2270/329; F05B 2270/331; F05B 2270/802; F05B 2270/808
See application file for complete search history.

(56) References Cited

U.S. PATENT DOCUMENTS

| 11,286,911 B2 | 3/2022 | Caponetti et al. |
| 2013/0110414 A1 | 5/2013 | Caponetti et al. |
| 2022/0178352 A1* | 6/2022 | Albisu Iso .............. F03D 17/00 |
| 2023/0003199 A1* | 1/2023 | Arroyo Beltri ......... F03D 17/00 |

FOREIGN PATENT DOCUMENTS

| EP | 3631204 A1 | 4/2020 |
| GB | 2459726 A | 11/2009 |
| WO | WO2017093512 A1 | 6/2017 |

OTHER PUBLICATIONS

European Search Report Corresponding to EP21382596 dated Dec. 13, 2021.

* cited by examiner

*Primary Examiner* — Christopher R Legendre
(74) *Attorney, Agent, or Firm* — Dority & Manning, P.A.

(57) ABSTRACT

A method for operating a wind turbine determines reliability of an azimuth measurement system by measuring loads with load sensors during operation of the wind turbine. Based on the measured loads, in-plane moments generated on the blades at a rotational speed frequency of the rotor are determined. The azimuth measurement system has reduced reliability if the angular phase of the in-plane moments at the rotor rotational speed frequency of the rotor deviates from an angular phase measured by the azimuth measurement system by more than a first threshold value. The method generates a warning signal or changes operation of the wind turbine when it is determined that the azimuth measurement system has reduced reliability.

12 Claims, 8 Drawing Sheets

AZIMUTH SENSORS IN WIND TURBINES

The present disclosure relates to wind turbines, and more particularly relates to methods and systems for determining reliability or correct functioning of azimuth sensors in a wind turbine.

BACKGROUND

Modern wind turbines are used for supplying electricity to the grid. A wind turbine generally includes a tower with a nacelle supported on top of the tower. A wind turbine rotor comprising a hub and a plurality of wind turbine blades may be rotatably mounted to the nacelle.

The wind turbine blades may be set in motion by wind. The hub of the wind turbine may be operatively coupled with a rotor of a generator. As the hub and blades rotate, the kinetic energy of the wind is converted to kinetic mechanical energy of the wind turbine rotor and ultimately to electrical energy or power in the generator. The generator may typically be arranged inside the nacelle.

The wind turbine rotor may be coupled directly to the generator rotor in so-called direct drive wind turbines. Or the wind turbine rotor may include a main rotor shaft (a so-called "low speed shaft" which leads to a gearbox. A high-speed shaft of the gearbox may then drive the generator. Regardless of the topology of the wind turbine, the electrical power output of the generator may be fed to an electric grid. The connection of the generator to the grid may include e.g. a converter, transformer, medium voltage line and other.

A wind turbine controller may be configured to determine suitable actuator setpoints for the wind turbine based on the prevailing circumstances. The actuator setpoints for modern variable speed wind turbines include e.g. the generator torque and the pitch angle of the blades. Through control of the pitch angle(s) of the blade(s) and the generator torque, the speed of the rotor may be controlled, as well as the electrical power output, aerodynamic thrust and further mechanical loads. The purpose of the control system is generally to maximize electrical power output while at the same time keeping loads in the wind turbine at an acceptable level.

As mentioned before, the actuator setpoints of torque and pitch (but also other actuators such as yaw) may be changed in accordance with circumstances. Important input for the determination of the actuator setpoints include e.g. wind speed, and wind direction. The wind speed may be measured directly or indirectly e.g. through the use of a (generator) rotor speed sensor.

Wind turbines may also comprise load sensors on or in the blades for measuring loads on the blades caused by for example the wind and/or the weight of the blades. Too high loads on the blades can e.g. damage the blades and/or cause undesirable rotational speeds of the rotor which may damage other components of the wind turbine. The blade load sensors permit detecting high loads and make it possible to react, by e.g. acting on the pitch systems in such a way that loads on the blades may be reduced. These adjustments on the blades through the pitch systems may extend the life of the wind turbine and/or reduce the cost of producing power.

Load sensors for measuring loads on wind turbines, and particularly wind turbine blades may include resistive strain gauges, fiber optic strain gauges or any other known strain sensing system.

Different blade loads may be defined for a wind turbine blade, namely edge-wise loads, spanwise loads and flap-wise loads. A spanwise direction refers to a direction along a longitudinal axis of the blade, extending from the blade root towards the blade tip. The edge-wise direction refers to a direction along the chord of a section of the wind turbine blade, i.e. extending from leading edge to trailing edge. The flap-wise direction is perpendicular to both the edge-wise and the spanwise direction.

With respect to a wind turbine rotor, loads may be decomposed as in-plane loads (loads that are tangential to the rotor plane) and out-of-plane loads (loads that are perpendicular to the rotor plane). The rotor plane may herein be defined as a plane perpendicular to the rotor rotational axis and passing through a center of the blades at the blade root.

A further sensor that may be used in wind turbine operation(s) is an azimuth sensor. An azimuth angle indicates the angular position of the wind turbine rotor in the rotor plane. Although any specific reference position may be chosen, in an example, tin the 0° position, one of the blades may be in the 12 o'clock position (pointing straight upwards). In a three-bladed rotor, the other two blades may be in the 4 o'clock position, and in the 8 o'clock position respectively. Maintaining the same reference position, in the 90° position of the rotor, the three blades would be in the 3 o'clock position (substantially horizontal), the 7 o'clock position and the 11 o'clock position respectively.

An azimuth sensor as used throughout the present disclosure is any suitable sensor or sensor system which may be used to measure the azimuth position of the rotor. In an example, the azimuth sensor may be an encoder fixed to the wind turbine rotor shaft, or to the generator rotor.

For wind turbine operation in general, and specific maintenance operations in particular, the correct functioning of the azimuth sensor is thus important. For example, individual blade pitch control may be based on signals from the azimuth sensor. In a rotor locking operation, the wind turbine rotor needs to be positioned precisely in one of a plurality of predefined positions, such that the locking mechanism on the nacelle can engage with the wind turbine rotor (hub) and maintenance can be carried out.

Azimuth sensors can be calibrated in order to preserve their accuracy. Calibration normally comprises establishing correspondence between indications generated by the azimuth sensors and values of reference according to calibration patterns (i.e. particular conditions for calibration). Such a calibration is generally carried out offline (i.e. when the wind turbine is nor in operation) and requires specific conditions (no wind or very low wind speeds). In examples, it may require visual inspection by personnel on the ground to determine when the rotor is in a specific operation.

It is known that azimuth sensors can degrade over time. Particularly, it has been found that azimuth sensors may show a "drift" behaviour in the error, i.e. the difference between the actual angular position of the rotor and the indicated position increases over time. Also, after a maintenance operation it has been found that an offset may be introduced in the system.

Wrong indications from the azimuth sensors can lead to a wrong or suboptimal load control, and/or wrong or suboptimal individual or collective pitch control which in turn can lead to higher (fatigue) loads, and/or reduced energy output. Wrong indications from the azimuth sensors can lead to complications in maintenance operations and increased maintenance time.

The present disclosure provides examples of methods and systems for determining reliability or correct functioning of azimuth sensors that resolve at least some of the aforementioned disadvantages.

SUMMARY

In a first aspect, a method for determining reliability of an azimuth measurement system in a wind turbine is provided. The method comprises, measuring loads with the load sensors during operation of the wind turbine and determining in-plane moments with rotor rotational speed frequency of one or more blades based on the measured loads. The method then further comprises determining an angular phase of a wind turbine rotor based on the in-plane moments with rotor rotational speed frequency and determining that the azimuth measurement system has reduced reliability if an angular phase of the in-plane moments with rotor rotational speed frequency deviates from an angular phase measured by the azimuth measurement system by more than a first threshold value.

In accordance with this aspect, the reliability or correct functioning of azimuth sensors can be determined during operation of the wind turbine, i.e. the operation of the wind turbine does not need to be interrupted or put in specific conditions in order to be able to determine whether the azimuth measurement system is correctly indicating the azimuth position. The loads measured may be measured as in-plane moments or converted to in-plane moments. The in-plane moments at any given moment during operation will be a combination of aerodynamic loads and loads due to mass of the blades. The mass of the blades will however provide the same moment throughout every rotation of the blade. At a 12 o'clock position and at a 6 o'clock position, the mass of the blade will not contribute to a bending moment. But at a 3 o'clock position and a 9 o'clock position, the bending moment due to the mass of the blade will be at a maximum (in one direction, and in the opposite direction respectively). The mass of the blade will have a well-defined contribution with 1p frequency, i.e. the variation of the moment due to the mass will have the same frequency as the rotor rotational speed. The rotor in this respect refers to the wind turbine rotor, not to the generator rotor. The generator rotor may have the same rotational speed in the case of a direct drive wind turbine, but may have a very different speed in the case of a wind turbine with gearbox.

The terms "1p frequency" and "rotor rotational speed frequency" may be used interchangeably throughout this disclosure.

By selecting the in-plane moments with the rotor rotational speed frequency and comparing the angular phase of selected in-plane moments with a measured azimuth phase angle, a deviation between the two indicates a possible malfunctioning of the azimuth measurement system. Once such a possible malfunctioning is detected, different actions can be taken to reduce the risk of a malfunctioning azimuth measurement system.

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
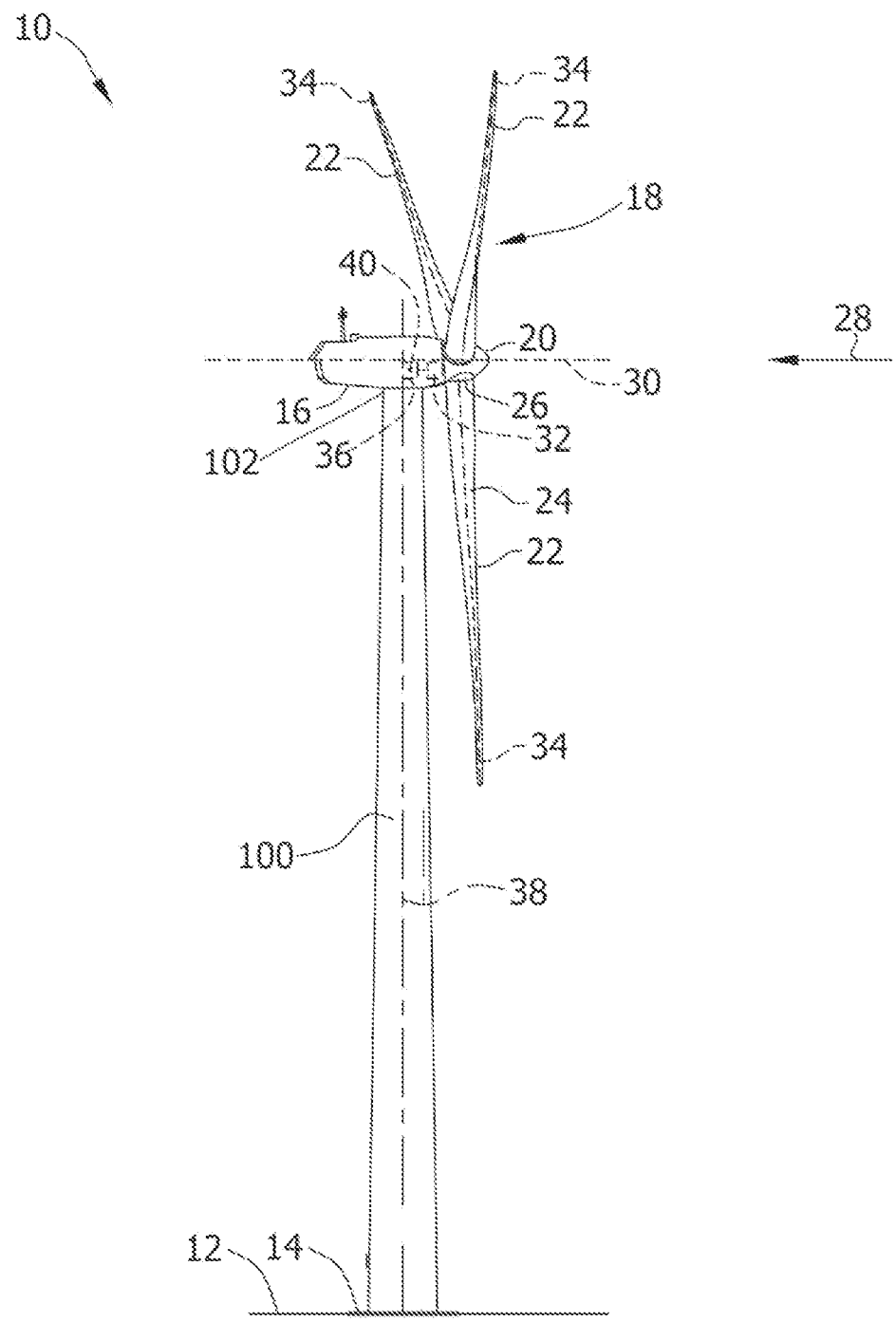
FIG. 1 illustrates a perspective view of a wind turbine according to one example.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
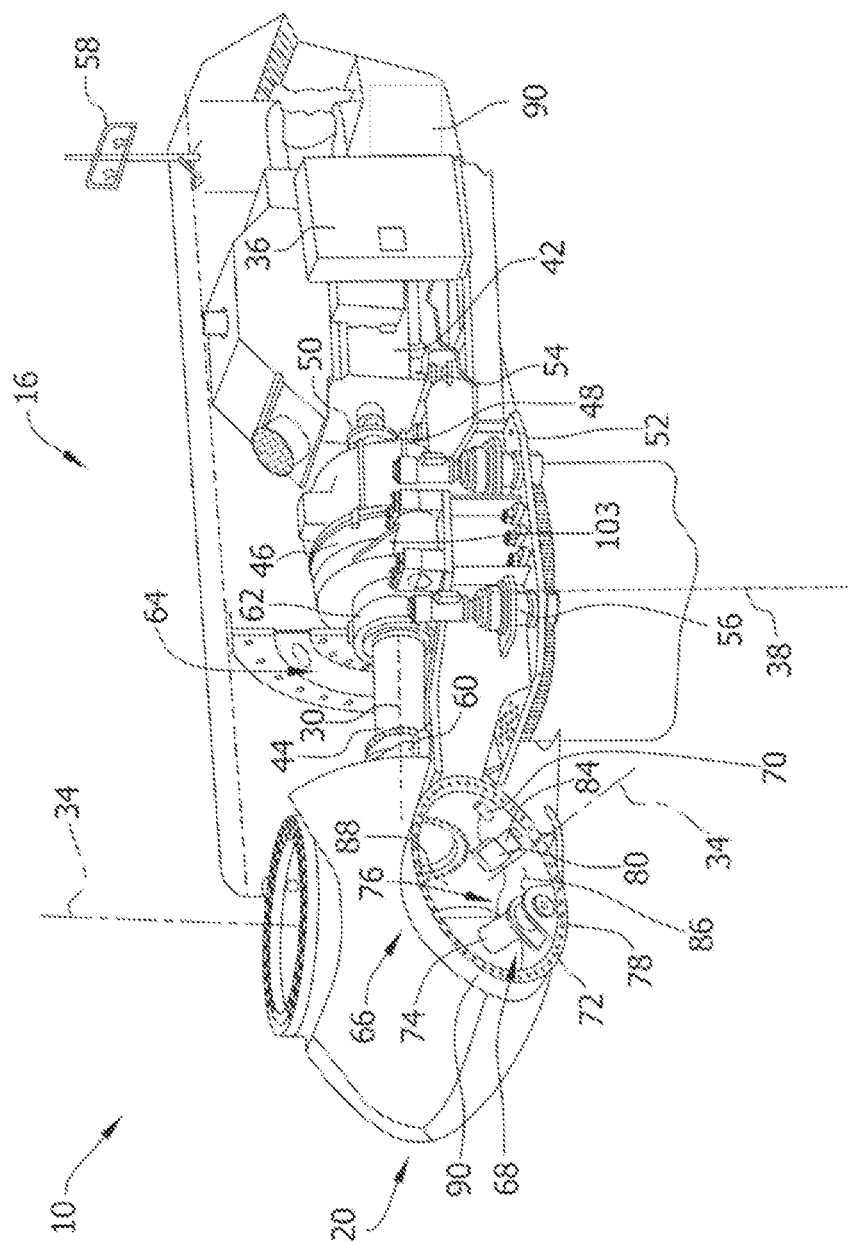
FIG. 2 illustrates a detailed, internal view of a nacelle of a wind turbine according to one example.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV) or higher voltage, e.g. 66 kV. Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power supply 84, for example comprising a battery, electric capacitors or an electrical generator driven by the rotation of the hub 20, is arranged at or within the hub 20 and is coupled to the sensor 70, the pitch control system 80, and to the pitch drive system 68 to provide a source of power to these components. In the example, the power supply 84 provides a continuing source of power to the pitch assembly 66 during operation of the wind turbine 10. In an alternative embodiment, power supply 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power supply 84 operates to provide electrical power to the pitch assembly 66 such that pitch assembly 66 can operate during the electrical power loss event.

In the example, the pitch drive system 68, the sensor 70, the pitch control system 80, cables, and the power supply 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3:
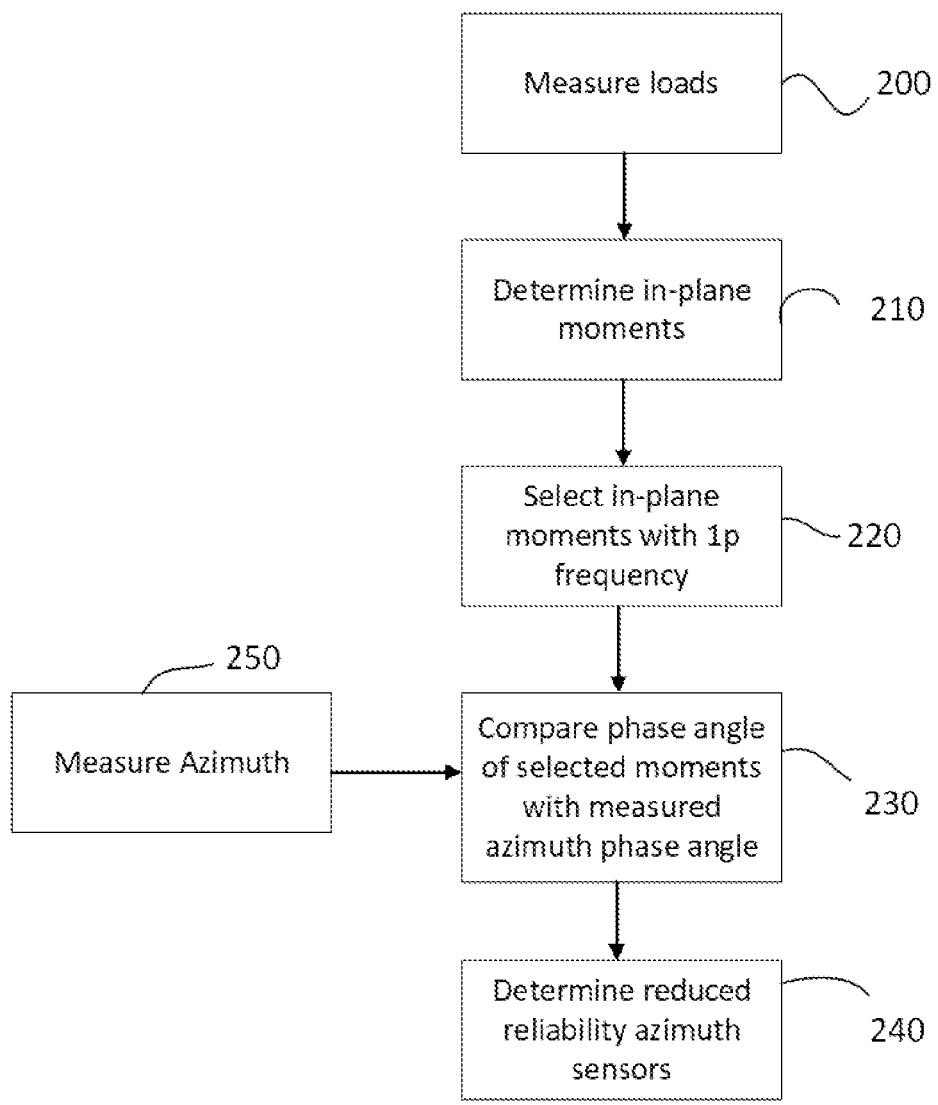
FIG. 3 schematically illustrates an example of a method for determining reliability of an azimuth measuring system in a wind turbine.

FIG. 3 schematically illustrates an example of a method for determining reliability of an azimuth measurement system in a wind turbine. The method comprises, at block 200, measuring loads with load sensors during operation of the wind turbine. At block 210, in-plane moments based on the measured loads are determined. Then, at block 220, the in-plane moments with 1p frequency are selected.

At block 250, an azimuth angle of a wind turbine rotor is measured. At block 230, the phase angle of the selected in-plane moments may be compared with the phase angle of the theoretical in-plane moments due to a mass of the blades. Then, at block 240, the determination may be made that the azimuth measurement system has reduced reliability if the phase angle of the selected in-plane moments deviates from the phase angle of the theoretical in-plane moments by more than a first threshold value.

In examples, theoretical in-plane moments due to a mass of one or more of the blades derived from the azimuth phase angle may be compared with the phase angle of the selected in-plane moments to determine (reduced) reliability.

In some examples, the measuring loads at block 200 may comprise measuring flap-wise and edge-wise moments. Standard wind turbine blades may incorporate suitable load sensors. The load sensors may be strain gauges. Depending on where and how the load sensors are mounted, strains may be measured in different directions. Sensors arranged in the hub, or any other (indirect) blade support may be used to determine loads as well.

Edge-wise and flap-wise loads may be used in control of wind turbines. The edge-wise and flap-wise moments may be converted to in-plane moments and out-of-plane moments based on a pitch angle of the blade at block 210. Only the in-plane moments need to be considered in the present method, since the loads of the mass of the rotor wind turbine blades will be in-plane loads, not out-of-plane loads.

At block 220, the selecting the in-plane moments with rotor rotational speed frequency may comprise filtering the determined in-plane moments using a peak filter. A peak filter is a frequency filter that passes a narrow band of frequencies and is configured to stop all other frequencies. A peak filter in this respect is, in essence, a very narrow band pass filter. The result of the filter may be seen at the top of FIG. 4, in which for three blades of a wind turbine, in-plane modes with 1p frequency are shown during a number of complete revolutions of the wind turbine rotor.

From the selected in-plane moments a phase angle of each of the individual blades may be derived. For each of the individual blades, the maximum moment corresponds to the corresponding three o'clock position of the blade, and the minimum moment (or maximum negative moment) corresponds to the nine o'clock position of the blade.

If the azimuth measurement system works correctly, then the moments due to the mass of the blades should correspond to the theoretical moments that would be caused by the mass of the blades in the measured azimuth positions. In other words, if the azimuth measurement system works correctly, then the phase angle of the moments due to the mass of the blades should correspond to the measurement azimuth angle. The measured azimuth angle is shown in the middle of FIG. 4.

Figure 4:
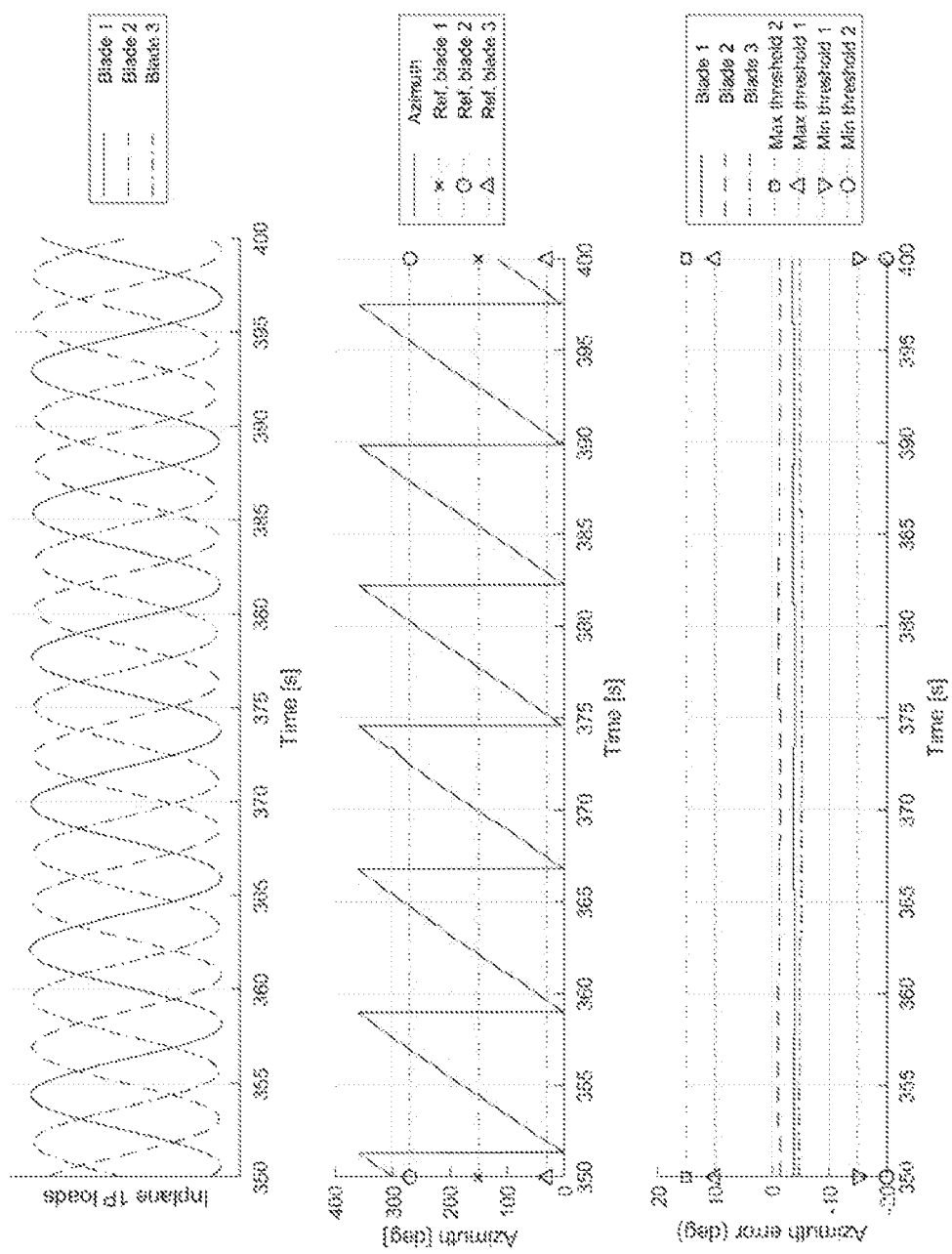
FIG. 4 schematically illustrates an example of a comparison between in-plane moments due to the mass of rotor blades and measured azimuth positions.

At the bottom of FIG. 4, a phase angle difference is depicted for each of the individual blades. A phase angle difference may be determined continuously, or as in the example of FIG. 4, once per full revolution.

In the example of FIG. 4, the individual rotor blades shown a mismatch of the measured azimuth angle with the azimuth angle derived from the analysis of the loads, is between −2 and 5°. In this specific example, two different angular thresholds have been defined.

At block 240, the determination may be made that the azimuth measurement has reduced reliability if the phase angle of the selected in-plane moments deviates from the phase angle of the theoretical in-plane moments by more than a first threshold value.

In some examples, the first threshold value may be an angle between 6 and 15°, specifically between 8 and 15°. In FIG. 4, the first threshold value is chosen at 10°.

In some examples, the comparison of the angular difference may be determined for each of the blades individually. Angular difference for individual blades may be compared to an allowable maximum or threshold. In other examples, an average of the phase angle difference for the blades may be compared with the threshold value.

In some examples, the method may further comprise generating a warning signal, or changing operation of the wind turbine when it is determined that the azimuth measurement system has reduced reliability. Changing the operation of the wind turbine may include one or more of the following: derating the wind turbine, deactivating or changing one or more control algorithms that rely on measurements of the azimuth measurement system.

In some examples, the method may further comprise generating a first warning signal if the azimuth measurement system has reduced reliability. A first threshold may be defined which indicates a malfunctioning. If the threshold is passed, different actions may be taken. Maintenance may be planned to substitute or recalibrate sensors. Or the operation of the wind turbine may be downrated, i.e. loads on the wind turbine may consciously be reduced at the expense of electrical power generation, because the measurements of the sensors are not as reliable as they should be. In yet further examples, control algorithms and methods that rely on input from azimuth sensors may be disabled and/or substituted by other algorithms and methods. In other examples, the wind turbine operation may be stopped if the azimuth sensors are determined to be unreliable. In examples, different threshold levels (two or more), and for each threshold different actions may be defined including warning signals, planning maintenance or recalibration, disabling or adapting control functions, control to reduce loads, interrupting of operation and others.

In some examples, as in FIG. 4, the method may further comprise determining whether the angular phase of the in-plane moments with rotor rotational speed frequency of the one or more blades deviates from an angular phase of the theoretical in-plane moments by more than a second threshold value, the second threshold value being higher than the first threshold value.

The second threshold value may be between 10° and 20°. In the specific example of FIG. 4, the second threshold value is fixed at 15°. In examples, the method may further comprise interrupting the operation of the wind turbine, if the phase angle of the selected in-plane moments of the blades deviates from the phase angle of the theoretical in-plane moments of the blades by more than the second threshold value. In these examples, a first threshold may generate a warning signal (operators are made aware of a potential problem and operation may continue, as normal or with some changes), and the passing of a second threshold indicates a more serious warning (e.g. interruption of the operation, downrating of operation or other).

In a further aspect, a wind turbine system is provided. With reference to FIG. 1, the wind turbine system comprises a wind turbine 10 including a wind turbine rotor 18 with a plurality of blades 22, a plurality of load sensors for measuring loads on the blades 22, and an azimuth measurement system to determine an angular position of the wind turbine rotor 18 in a rotor plane.

The wind turbine system further comprises a control system configured to carry out any of the methods illustrated herein.

Figure 6:
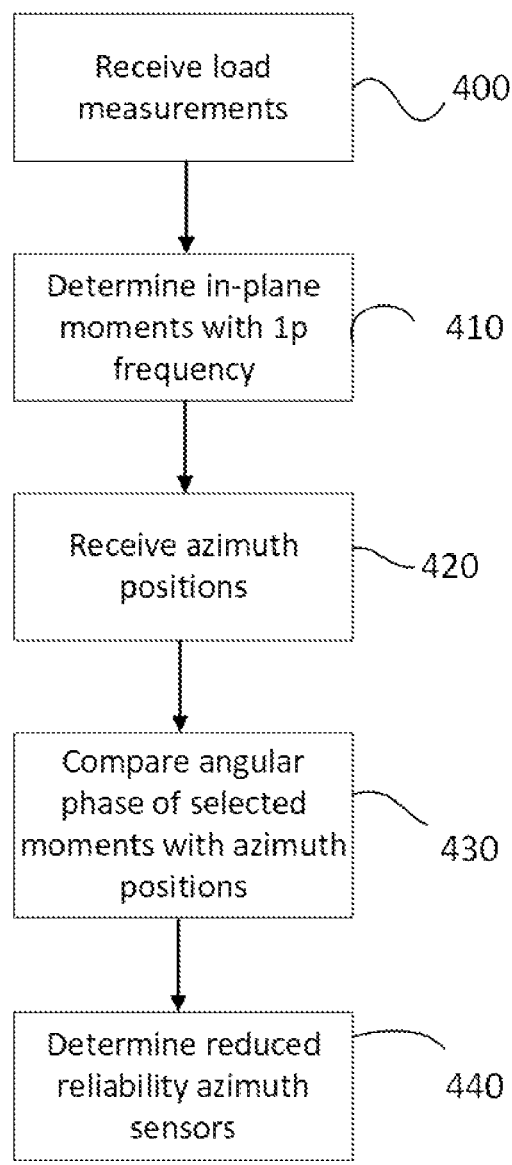
FIG. 6 schematically illustrates a method for on-line determination of correct functioning azimuth sensors as may be implemented in a wind turbine controller, and FIGS. 7A and 7B schematically illustrate a comparison between measured in-plane moments and theoretical in-plane moments based on a measured azimuth angle.

With reference to FIG. 6, in particular, the control system may be configured to receive signals from the load sensors during operation, at block 400. The control system may further, at block 410, determine in-plane moments on one or more of the blades. In particular, at block 410, the in-plane moments with 1p frequency may be determined or selected.

The control system may further be configured, at block 420, to receive azimuth positions from one or more azimuth sensors. The control system may further be configured to compare the compare a phase angle of the selected in-plane moments with a measured azimuth phase angle; and to determine if the phase angle of the selected in-plane moments deviates from the measured azimuth phase angle by more than a predefined threshold. If this determination is made, at block 440, reduced reliability of the azimuth sensors is detected. The control system may further be configured to generate a warning signal if the reduced reliability is detected. As mentioned before, the warning signal may take different forms and may lead to a variety of actions including scheduled maintenance, replacement or recalibration of a sensor, interruption of operation, sending of a warning to a remote operating centre and other. In further examples, input from an azimuth sensor that may still be regarded as reliable may be selected as input (disregarding inputs from other azimuth sensors).

Figure 7A:
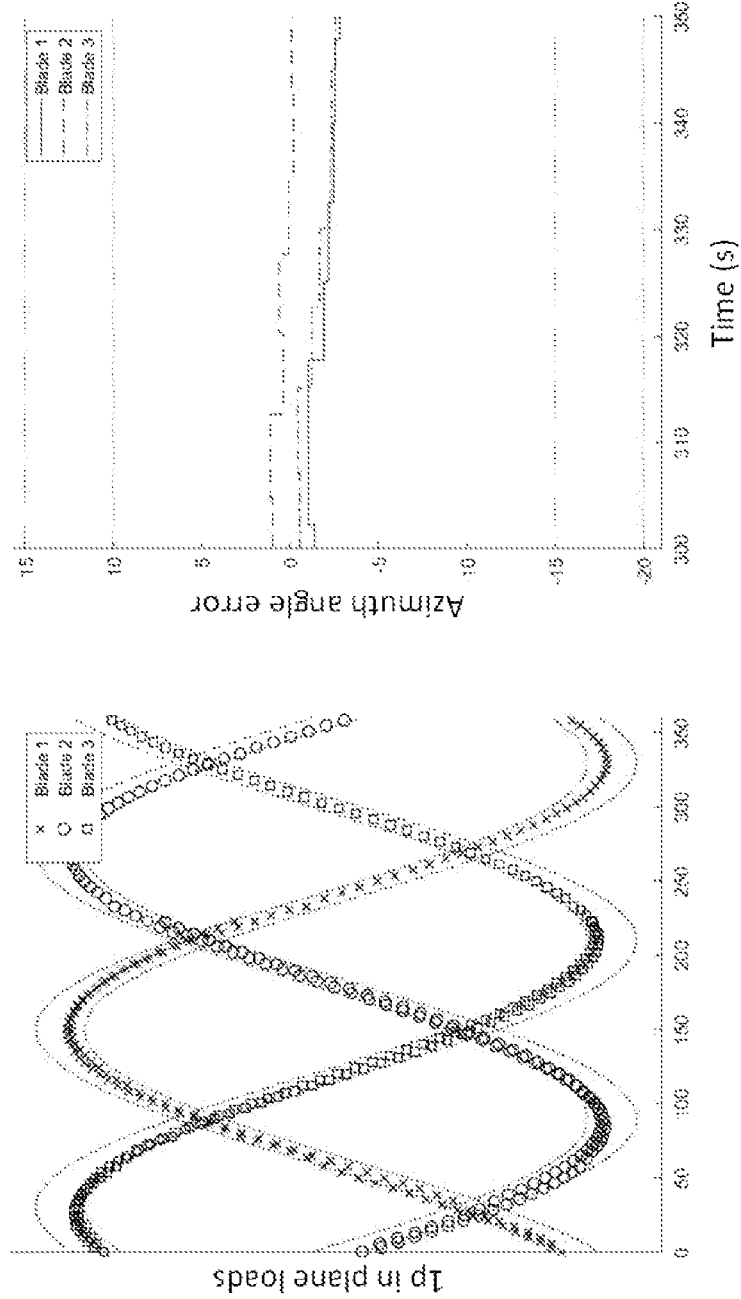
Figure 7B:
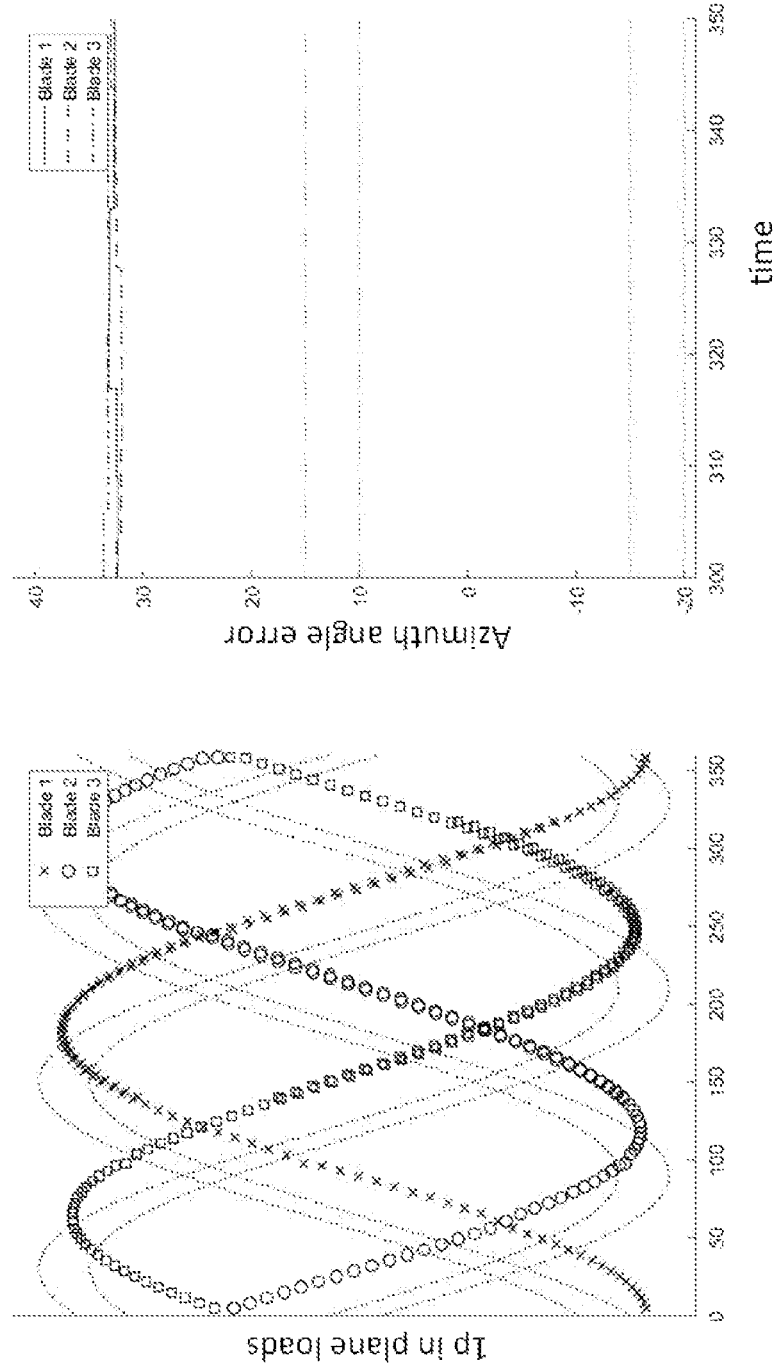

FIGS. 7A and 7B schematically illustrate a comparison between measured in-plane moments and theoretical in-plane moments based on a measured azimuth angle.

In the situation of FIG. 7A, a comparison is made for the three individual blades between the measured in-plane moments (thick lines) and the theoretical in-plane moments based on the measured azimuth angle (interrupted lines indicated upper and lower thresholds). That is, an indirect comparison is made between the phase angle that can be derived from the measured in-plane moments and the phase angle as measured by the azimuth sensor. In the situation of FIG. 7A, it may be seen (right hand side of the figure) that the difference in phase angle is generally in the range between +5° and −5°. In the specific example, a first threshold is shown to be defined at 10°, and a second threshold at 15°. Differences in the results between individual blades can generally be explained by accuracy or errors in measurements.

In the situation of FIG. 7B, it may be seen instead that there is a significant difference, around 30°, between the measured azimuth angle, and the angle that can be derived from the load measurements. It may furthermore be seen that the deviation is not only found for an individual blade (which could potentially indicate a problem with measurements of an individual blade), but rather for each of the three blades.

It has been found that even if load sensors may also have reduced reliability at times, such a reduced reliability will generally affect the absolute values of the measurements, but not so much the phase angle. Therefore, examples of the methods provided herein may even be used if the load sensors have a reduced reliability, to some extent.

In some examples, wherein each of the blades may comprise strain gauges. In particular, some of the strain gauges may be arranged to measure flap-wise moments, and other strain gauges may be arranged to measure edge-wise moments. The strain gauges may be located at or near the root of the blade, where the bending moments will be highest. In other examples, the strain gauges may be located at a spanwise position at a distance from the root. The measurements of such strain gauges may be converted to moments at the blade root in some examples. In examples, measurements from load sensors on the blades that are not at the root of the blade may be extrapolated to indicate moments at the root of a blade. In examples, the sensors may be mounted at a suitable location on the hub, instead of the blade.

In other examples, other sensors or systems may be used for measuring stress and strain, and/or to derive bending moments in the blades. Suitable strain gauges may include resistive foil strain gauges. The resistive strain gauges may be attached to the blade with a suitable glue, e.g. epoxy based glue. Other types of strain gauges and sensors may also be used such as e.g. piezoresistors, capacitive strain gauges, or fiber optics to measure strain along an optical fiber, or accelerometers.

In some examples, the azimuth measurement system comprises a rotary encoder. Such a rotary encoder may be arranged with the wind turbine rotor, including the low-speed shaft, or the hub. A rotary encoder may also be arranged with the generator rotor or high-speed shaft. In further examples, the azimuth measurement system may be based on e.g. a capacitance, inductance, magnetic or proximity sensor arranged with the hub. The interaction of the hub with a nacelle mounted element may be measured with such sensors to determine an azimuth angle.

In some examples, the control system may be at a remote location from the wind turbine. The control system may be part of a SCADA system of a wind farm, or may be at a remote operating centre. In some examples, the wind turbine controller itself may incorporate the functions for determining a potential malfunction or loss of reliability of the load sensor. The control system may also form part of the wind turbine controller i.e. the combination of hardware and/or software provided in the wind turbine itself.

Figure 5:
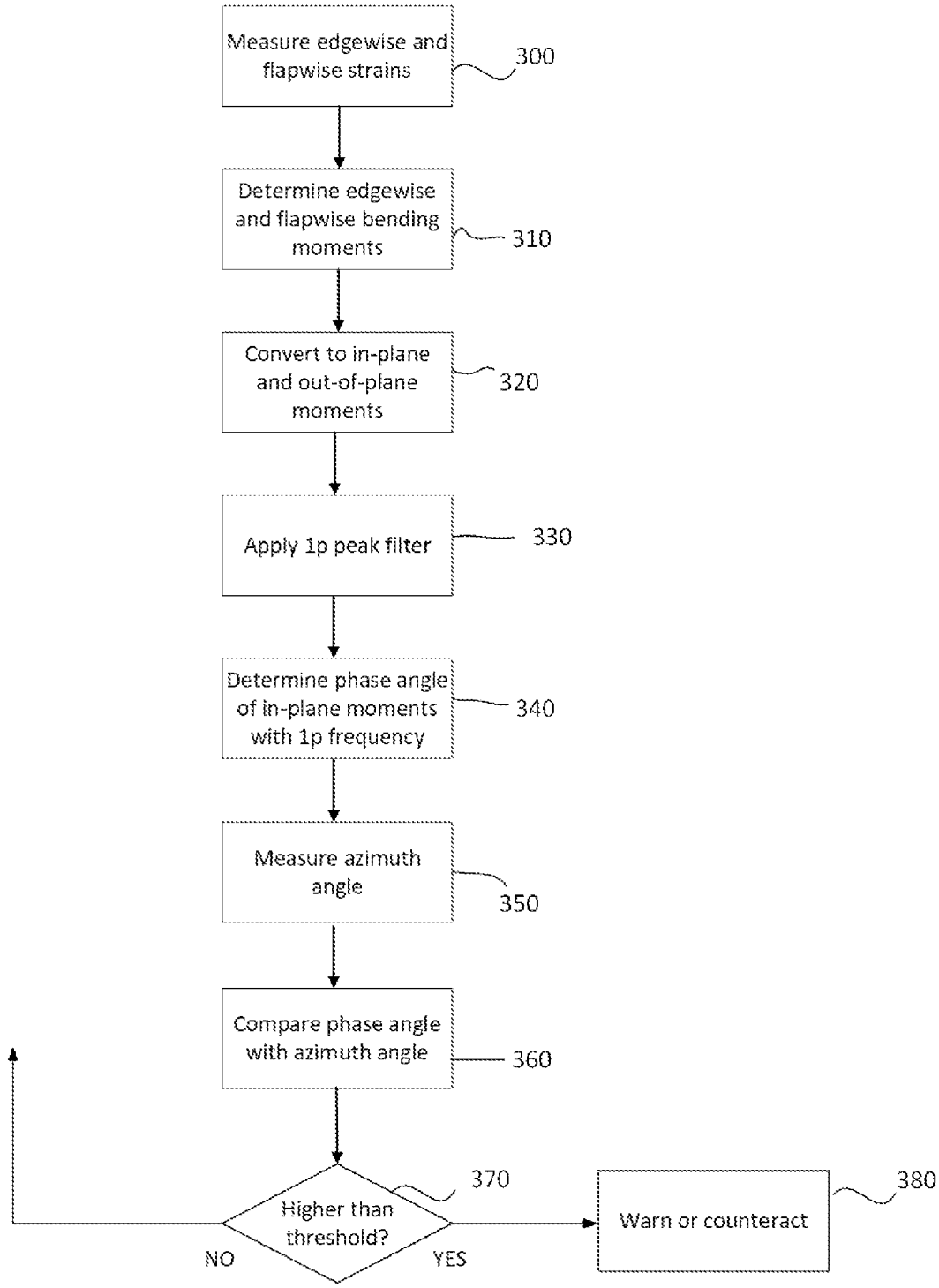
FIG. 5 schematically illustrates another example of a method for determining reliability of a wind turbine azimuth measurement system.

FIG. 5 schematically illustrates another example of a method for determining reliability of a wind turbine azimuth measurement system. FIG. 5 schematically illustrates a method for on-line determination of correct functioning of azimuth sensors of a wind turbine. "On-line" determination may be herein regarded as a determination that occurs during normal operation of the wind turbine, and substantially in real-time. Therefore, the determination does not require a specific operational sequence or specific operational conditions.

The method comprises measuring edge-wise and flap-wise strains in a wind turbine blade, at block 300. The method them comprises, at block 310, determining edge-wise and flap-wise bending moments in the wind turbine blade based on the measured strains.

At block 320, the determined edge-wise and flap-wise bending moments may be converted to measured in-plane moments and measured out-of-plane moments on the wind turbine blade. The conversion from edge-wise and flap-wise to in-plane and out-of-plane may be based particular on the pitch angle of the individual blade. At block 330, a peak filter may be applied to determine the measured in-plane moments with 1p frequency. And at block 340, a phase angle of the of the in-plane moments with 1p frequency may be determined.

The method comprises, at block 350, measuring an azimuth angle of the rotor blade with the azimuth sensor. Then, at block 360, the phase angle determined based on the measured in-plane moments with 1p frequency may be compared with the measured azimuth angle.

At block 370, the azimuth sensors are determined to function correctly, if an angular phase of the measured in-plane moments with 1p frequency differ less than a threshold phase angle difference from measured azimuth angle. The operation of the wind turbine may continue as normal, as schematically indicated in FIG. 5. If the angular difference is above the threshold, an action may be taken to counteract the malfunction of the azimuth sensor, and/or a warning may be generated.

Even though FIG. 5 illustrates a method for a single blade of a wind turbine, the same method may be applied to multiple blades of the same wind turbine.

In some examples, the method may further comprise interrupting operation of the wind turbine if the warning is generated or downrating the wind turbine if the warning is generated.

The order shown of method steps in FIGS. 3, 5 and 6 are not to be regarded as necessarily sequential. In particular, the determination of azimuth angles does not need to occur at any specific moment of time in comparison to the measurement of the loads. The measured loads and azimuth angle only need to be correlated in time to make a meaningful comparison. Also, the methods may be continuously carried out during operation of the wind turbine. Steps may be carried out at a frequency of more than 1 HZ, specifically at a frequency of higher than 10 Hz.

Throughout the present disclosure a reference has been made to a comparison between the measured azimuthal phase angle and the phase angle that can be derived from in-plane bending moments with 1p frequency (i.e. those moments that theoretically can be attributed to the weight or mass of the blades only). Such a comparison may be made directly in some cases. In other cases, a comparison may be made between the angular phase of the measured in-plane bending moments with 1p frequency and the theoretical moments caused by the mass of the blades, wherein the theoretical moments may be calculated based on the measured azimuth angle.

Throughout the present disclosure, reference has been made to a comparison with a threshold. Such a comparison may be based on a single revolution of a wind turbine rotor. In other examples, a comparison with a threshold (or multiple thresholds) may be made based on a plurality of rotor revolutions, e.g. 5 or 10 or more.

Examples of the methods disclosed herein may be implemented with hardware, software, firmware and combinations thereof.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and circuits described in connection with the disclosure herein may be implemented or performed with one or more general-purpose processors, a digital signal processor (DSP), cloud computing architecture, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also related to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for operating a wind turbine, the wind turbine including a rotor with rotor blades, the method comprising:
   determining reliability of an azimuth measurement system in the wind turbine by:
   measuring loads with load sensors during operation of the wind turbine;
   based on the measured loads, determining in-plane moments generated on one or more of the blades at a rotational speed frequency of the rotor;
   determining that the azimuth measurement system has reduced reliability when if the angular phase of the in-plane moments at the rotor rotational speed frequency of the rotor deviates from an angular phase measured by the azimuth measurement system by more than a first threshold value;
   generating a warning signal or changing operation of the wind turbine when it is determined that the azimuth measurement system has reduced reliability.

2. The method according to claim 1, wherein the measuring loads comprises measuring flap-wise and edge-wise moments.

3. The method according to claim 2, wherein the flap-wise and edge-wise moments are converted to the in-plane moments based on a pitch angle of the one or more blades.

4. The method according to claim 1, wherein the measured loads are filtered using a peak filter to determine the in-plane moments of the one or more blades.

5. The method according to claim 1, wherein the first threshold value is an angle between 6 and 15 degrees.

6. The method according to claim 1, wherein the angular phase measured by the azimuth measurement system comprises theoretical in-plane moments due to a mass of the individual blades based on a measured azimuthal position of the rotor.

7. The method of claim 1, wherein changing the operation of the wind turbine includes one or more of the following: derating the wind turbine, deactivating or changing one or more control algorithms that rely on measurements of the azimuth measurement system.

8. The method of claim 1, further comprising determining whether the angular phase of the in-plane moments at the rotor rotational speed frequency of the one or more blades deviates from the measured angular phase by more than a second threshold value, the second threshold value being higher than the first threshold value.

9. The method of claim 8, further comprising interrupting the operation of the wind turbine when the second threshold value is exceeded.

10. A wind turbine system comprising:
    a wind turbine including a wind turbine rotor with a plurality of blades;
    a plurality of load sensors configured to measure loads on the blades;
    an azimuth measurement system configured to determine an angular position of the wind turbine rotor in a rotor plane;
    a control system configured to:
    receive signals from the load sensors during operation of the wind turbine;
    receive signals from the azimuth measurement system;
    determine in-plane moments on one or more of the blades;
    select the in-plane moments generated on the one or more blades at a rotor rotational speed frequency;
    compare a phase angle of the selected in-plane moments with a measured azimuth phase angle; and
    generate a warning signal if the phase angle of the selected in-plane moments deviates from the measured azimuth phase angle by more than a predefined threshold.

11. The system of claim 10, wherein the load sensors are strain gauges mounted one each of the one or more blades so as to measure edge-wise and flap-wise loads.

12. The system of claim 10, wherein the azimuth measurement system comprises a rotary encoder.

* * * * *